United States Patent [19]

Dietz et al.

[11] 4,194,076
[45] Mar. 18, 1980

[54] WASHING MAGNESIUM REDUCING AGENT PREPARED IN ABSENCE OF COMPLEXING DILUENT

[75] Inventors: Richard E. Dietz; Oscar D. Nowlin, both of Bartlesville, Okla.

[73] Assignee: Phillips Petroleum Company, Bartlesville, Okla.

[21] Appl. No.: 900,555

[22] Filed: Apr. 27, 1978

Related U.S. Application Data

[63] Continuation-in-part of Ser. No. 686,966, May 14, 1976, abandoned.

[51] Int. Cl.$^2$ .......................... C08F 4/02; C08F 10/02
[52] U.S. Cl. ................................ 526/125; 252/429 B; 252/429 C; 526/151; 526/352; 526/906
[58] Field of Search ...................... 526/125, 144, 151; 252/429 B, 429 C

[56] References Cited

U.S. PATENT DOCUMENTS

| 3,392,162 | 7/1968 | Ziegler et al. ........................ 526/151 |
| 3,737,393 | 6/1973 | de Vries ................................ 526/151 |

FOREIGN PATENT DOCUMENTS

| 2230672 | 12/1972 | Fed. Rep. of Germany ............ 526/125 |
| 1128724 | 10/1968 | United Kingdom ....................... 526/142 |
| 1299862 | 12/1972 | United Kingdom ....................... 526/151 |
| 1358437 | 7/1974 | United Kingdom ....................... 526/124 |
| 1373981 | 11/1974 | United Kingdom ....................... 526/151 |
| 1373982 | 11/1974 | United Kingdom ....................... 526/151 |
| 1391322 | 4/1975 | United Kingdom ....................... 526/906 |

OTHER PUBLICATIONS

Glaze et al., J. Organometal Chem. 5 (1966), pp. 477–480.

*Primary Examiner*—Edward J. Smith

[57] ABSTRACT

An organic halide is reacted with magnesium metal in the absence of an ether or other complexing diluent, preferably in the absence of any extraneous diluent to produce a magnesium reducing agent. In one embodiment, the halide is added dropwise to the magnesium metal. The resulting magnesium reducing agent is then washed with an unreactive liquid hydrocarbon. An organoaluminum compound is mixed with the magnesium reducing agent either before or after the washing. The resulting cocatalyst produced by contacting the magnesium reducing agent with the organoaluminum compound is contacted with a titanium tetrahalide to give a catalyst. This catalyst is useful in the polymerization of 1-olefins and is of particular utility in the polymerization of ethylene at high productivity rates.

19 Claims, No Drawings

WASHING MAGNESIUM REDUCING AGENT PREPARED IN ABSENCE OF COMPLEXING DILUENT

CROSS REFERENCE TO RELATED APPLICATIONS

This is a continuation-in-part of copending application Ser. No. 686,966, filed May 14, 1976, now abandoned.

BACKGROUND OF THE INVENTION

This invention relates to magnesium reduced titanium tetrahalide catalyst systems.

It is known to reduce titanium tetrahalides with Grignard reagents, that is, RMgX compounds produced by reacting magnesium and an organic halide in the presence of ether. It is also known to produce what is termed in the art a "solventless" Grignard, which is produced by reacting magnesium metal with an organic halide in the presence of a solvent which is designated as a nonsolvating solvent (i.e., an inert noncomplexing diluent) such as a noncomplexing hydrocarbon as distinguished from an ether. True Grignard reagents, as a practical matter, present serious problems as reducing agents in the production of catalysts in view of the difficulty in removing the large amount of ether and the remaining complexed ether can reduce the effectiveness of olefin polymerization catalyst systems prepared with the thus treated Grignard reagent.

With olefin polymerization, particularly the polymerization of ethylene or predominantly ethylene-containing olefin mixtures, it has been found to be more economical to carry out the polymerization at a temperature low enough that the resulting polymer does not go into solution in the liquid diluent used, and to recover the polymer without elaborate catalyst removal steps. This results in residual catalyst remaining in the polymer and thus requires high productivity rates in order to be practical.

SUMMARY OF THE INVENTION

It is an object of this invention to provide a simplified method of producing active titanium catalyst for olefin polymerization;

It is a further object of this invention to provide a catalyst system capable of high productivities;

It is yet a further object of this invention to avoid the necessity for removing ether from catalyst components; and It is a further object of this invention in one aspect thereof to provide a magnesium reducing agent for the reduction of titanium tetrahalide without the use of any extraneous diluent.

In accordance with this invention a magnesium reducing agent prepared by reacting an organic halide with magnesium metal, is washed with an inert liquid hydrocarbon. Either before or after this washing the magnesium reducing agent is contacted with an organoaluminum compound to give a cocatalyst which is thereafter contacted with a titanium tetrahalide to produce the catalyst.

DESCRIPTION OF THE PREFERRED EMBODIMENTS

The organic halide can be a saturated or unsaturated hydrocarbyl halide of formula RX wherein R is an alkynyl, alkenyl, alkyl, aryl, cycloalkenyl or cycloalkyl radical or combinations thereof such as aralkyl and the like having 1 to about 12 carbon atoms per molecule and X represents a halogen atom, preferably chlorine or bromine. The organic halide can also be a polyhalogenated hydrocarbyl halide of formula $R'X_2$ in which $R'$ is a saturated divalent aliphatic hydrocarbyl radical containing from 2 to about 10 carbon atoms per molecule and X is a halogen atom as set out hereinabove. Exemplary organic halides include methyl chloride, n-butyl bromide, n-pentyl chloride, n-dodecyl chloride, allyl bromide, 1,2-dibromoethane, 1,4-dichlorobutane, 1,10-dibromodecane, cyclohexyl chloride, bromobenzene, and the like. A primary alkyl halide such as n-pentyl chloride is presently preferred.

The magnesium is in the form of the free metal, preferably in the form of a powder.

The reaction between the organic halide and the magnesium metal to form the magnesium reducing agent can be carried out in any suitable manner. Laboratory experiments have demonstrated, however, that care must be exercised if all of the halide and magnesium are combined essentially simultaneously since the reaction gives off a great deal of heat. Therefore, it is recommended that the halide be added slowly to the magnesium or the magnesium added slowly to the halide or that relatively small amounts of halide and magnesium for the size of the reactor be used, or that some form of cooling be employed, such as the use of a diluent which is nonreactive in the conditions of the reactor to absorb and carry away heat.

Preferably the reaction between the organic halide and the magnesium metal to form the magnesium reducing agent is carried out in the absence of any extraneous diluent. This can be done by simply adding the organic halide to magnesium metal powder in a container preferably with some stirring or agitation over a relatively long period of time, for instance, 1 to 10 hours. One way to accomplish this is to add the halide dropwise. It is also within the scope of the invention to carry out the reaction between the organic halide and the magnesium metal in the presence of a noncomplexing diluent such as a noncomplexing hydrocarbon diluent. Suitable such diluents include pentane, hexane, cyclohexane, methylcyclopentane, and the like, the same types of inert hydrocarbons suitable for use as diluents or solvents in the polymerization of 1-olefins being suitable for use as diluents in the production of the magnesium reducing agent. Other methods of reacting the halide with the magnesium metal include shaving magnesium metal from a large bar or the like into the organic halide, or milling the halide and magnesium metal. Particularly, in this last embodiment, the presence of a noncomplexing diluent to carry away heat may be preferred. The milling, for instance, with a conventional roll mill or conventional ball or rod mill maintains the proper surface while the noncomplexing diluent carries away heat. A vibratory ball mill can also be used, such mills being commercially available under the designation Vibratom, available from Angstrom, Inc. P.O. Box 248 Bellville, Michigan 48111. In all events, a complexing diluent such as ether is avoided.

The organic halide can be combined with the magnesium metal in an amount within the range of 0.25:1 to 1:0.25 (moles organic halide/gram atoms Mg). Preferably, however, about a stoichiometric amount (1/1 of halide is used.

The magnesium reducing agent is then washed with a dry nonreactive (inert) normally liquid hydrocarbon 1 to 4 or more times. The hydrocarbon can be selected from among paraffins, cycloparaffins and aromatics having 2 to about 20, preferably 5 to 12 carbon atoms per molecule. Exemplary compounds include n-pentane, n-hexane, n-heptane, isooctane, dodecane, cyclohexane, benzene, toluene, xylenes and mixtures thereof. Preferably the wash liquid is the same as that to be used as a diluent in the subsequent polymerization or else is compatible therewith. The treating temperature is normally accomplished at room temperature, i.e., about 25° C. although temperatures ranging from about 0° to 100° C. or higher can be used depending upon the boiling point or freezing point of the treating liquid. Generally, the wash treatment is carried out on the magnesium reducing agent/organoaluminum compound cocatalyst mixture since the mixture forms a friable mass. However, it is within the scope of this invention to wash magnesium reducing agent prior to its contact with the organoaluminum compound. It is speculated that the wash treatment removes some material that has a deleterious effect on the amount of polymer made. At any rate, the wash treatment is effective in substantially improving productivity of the catalyst system prepared with the washed product.

The term "in the absence of any extraneous diluent" (i.e., added diluent) as used throughout the specification and claims is meant to exclude the introduction of any complexing solvent or any noncomplexing inert diluent such as a hydrocarbon. Of ccourse, the organic halide itself is a liquid.

If exhaustive washing of the cocatalyst mixture is practiced, it is noted that it is possible to remove some or all of the organoaluminum compound. When enough is lost to adversely affect the resulting catalyst, it is necessary to replace it with additional material since in its absence an inactive catalyst system results.

The magnesium reducing agent can be washed in any manner known in the art. For instance, the inert hydrocarbon can simply be added to the magnesium reducing agent and the mixture agitated and thereafter allowed to settle and the supernatant liquid decanted off. Alternatively, the wash liquid can be removed by filtration or by using a centrifuge. It is frequently desirable to ball mill the magnesium reducing agent with the inert hydrocarbon wash liquid in both embodiments wherein the organoaluminum compound is already present and in the embodiments where it is not. In addition to ball milling, of course, pebble milling, rod milling, colloid milling and the like can also be used.

A typical analysis prior to washing of the magnesium reducing agent of this invention using n-pentyl chloride is:

| Compound | Weight Percent |
|---|---|
| Hydrocarbon Soluble Components | |
| Di-n-pentylmagnesium | 25.0 |
| Decane | 8.2 |
| Di-n-decylmagnesium | 1.1 |
| Magnesium n-pentoxide | 0.6 |
| Hydrocarbon Insoluble Components | |
| Magnesium chloride | 55.2 |
| Magnesium | 4.9 |
| Chloromagnesium hydride | 2.3 |
| n-Pentylmagnesium chloride | 2.0 |
| Magnesium n-pentoxide | 0.7 |

This is shown for illustrative purposes and is not intensed to limit the scope of the invention to the dropwise addition of n-pentyl chloride as used for this analysis. Substantial variation in the exact analysis from that shown is obtained if a different halogen is used or if a different organo radical is substituted for the n-pentyl. However, in all cases, whatever method is used to react the halide and the magnesium, there is present in accordance with the invention a substantial amount (at least 10 weight percent) each of the diorgano-magnesium compound and the magnesium halide. It is the reaction mixture that is the magnesium reducing agent as defined herein, i.e., including both hydrocarbon soluble components and hydrocarbon insoluble components.

Obviously much of the soluble portion of the magnesium reducing agent will be removed by this washing step, but the resulting insoluble portion has different characteristics from simple $MgCl_2$ prepared directly.

Preferred organoaluminum compounds are hydrocarbyl aluminum compounds of formula $R''_2AlZ$ in which $R''$ is the same or different and is selected from alkyl and aryl radicals containing from 1 to about 12 carbon atoms per molecule and Z is a hydrogen atom or a halogen atom, preferably chlorine or bromine. Exemplary compounds include dimethylaluminum bromide, diethylaluminum chloride, diisobutylaluminum hydride, diphenylaluminum chloride, ethylphenylaluminum chloride, di-n-dodecylaluminum bromide and the like. A presently preferred compound is diethylaluminum chloride. As noted hereinabove, the organoaluminum compound can be added either before or after the washing but in either event is added before contact of the magnesium reducing agent with the titanium tetrahalide. Compounds of the formula $AlR''_3$, $R''AlX_2$ and $R''_2AlOR''$ where $R''$ is as above and X is a halogen atom, preferably chlorine or bromine can also be used. Exemplary compounds are triethylaluminum, ethylaluminum dichloride and diethylaluminum ethoxide.

The titanium tetrahalide is either titanium tetrachloride, titanium tetrabromide, or titanium tetraiodide, preferably titanium tetrachloride.

It is within the scope of this invention to use one or more adjuvants, these being polar organic compounds, i.e., Lewis bases (electon donor compounds) either premixed with the organoaluminum component or as a third entity along with the magnesium reducing agent, organoaluminum compound and titanium tetrahalide or both. Suitable compounds for this purpose are described in U.S. Pat. No. 3,642,746 the disclosure of which is hereby incorporated by reference. They include alcoholates, aldehydes, amides, amines, arsines, esters, ethers, ketones, nitriles, phosphines, phosphites, phosphoramides, sulfones, sulfoxides, and stibines. Exemplary compounds include sodium ethoxide, benzaldehyde, acetamide, triethylamine, trioctyl arsine, ethyl acetate, diethyl ether, acetone, benzonitrile, triphenyl phosphine, triphenyl phosphite, hexamethyl phosphoric triamide, dimethyl sulfone, dibutyl sulfoxide and triethyl stibine. Triethylamine and triphenyl phosphite are particularly preferred.

Presently preferred adjuvants are the lower alkyl esters of benzoic acid which may be additionallyy substituted in the para position to the carboxyl group with a monovalent radical selected from the group consisting of —F, —Cl, —Br, —I, —OH, —OR''', —SH, —NH, —NR'''$_2$, —NHCOR''', —NO$_2$, —CN, —CHO, —COR''', —COOR''', —CONH$_2$, —CONR'''$_2$, —SO₂R''', and —CF₃. The R''' group is an alkyl radical of 1 to 4 carbon atoms. Exemplary compounds include ethyl anisate (ethyl p-methoxybenzoate), ethyl benzoate, methyl benzoate, ethyl p-dimethylaminobenzoate, ethyl p-fluorobenzoate, isopropyl p-diethylaminobenzoate, butyl p-fluorobenzoate, n-propyl p-cyanobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred esters are ethyl anisate and ethyl benzoate.

Generally when polymerizing ethylene, which is the preferred utility for the catalysts of this invention, no adjuvant is used. Generally an adjuvant is used in the less preferred embodiment of this invention where the catalyst is used for propylene polymerization.

The molar ratio of organoaluminum compound(s) to adjuvant(s) is usually in the range of about 1:1 to about 300:1. The atom ratio of aluminum to magnesium can range from about 0.1:1 to about 4:1, more preferably from about 0.5:1 to about 2:1. The molar ratio of titanium compound to adjuvant(s) is generally in the range of about 1:1 to about 200:1. The atom ratio of aluminum to titanium can range from about 20:1 to about 10,000:1, more preferably from about 75:1 to about 5,000:1.

The catalyst system of this invention can be used unsupported or supported on a particulate material including silica, silica-alumina, magnesia, magnesium carbonate, magnesium chloride, magnesium alkoxides such as magnesium methoxide, and the like. The weight ratio of titanium tetrahalide to support can vary from about 0.05:1 to about 1:1, more preferably from about 0.1:1 to about 0.3:1.

The catalyst system of this invention is useful for the polymerization of mono-1-olefins having 2 to 8 carbon atoms per molecule. It is of particular value in the preparation of ethylene polymers and copolymers of ethylene and a minor amount of another mono-1-olefin such as propylene, butene-1 or hexene-1. It is possible utilizing the catalyst system of this invention which gives such high productivities to carry out such polymerizations, particularly the polymerization of ethylene and predominantly ethylene-containing 1-olefin mixtures in an inert diluent at a temperature as described hereinbelow wherein the polymer formed is insoluble in the liquid diluent and is simply separated therefrom and utilized with no elaborate catalyst removal steps.

The polymerization conditions employed in the process are similar to other related processes in which a catalyst system comprising a titanium tetrahalide and an organoaluminum compound are used. The polymerization temperature generally falls within the range of 0° to 150° C., more preferably from about 40° to about 112° C. Any convenient partial pressure of ethylene is used. It generally falls within the range of about 10 to 500 psig (69 to 3447 kPa). The titanium concentration can vary between about 0.0005 to 10, preferably between about 0.001 to 2 milligram atoms per liter of diluent.

As is known in the art, control of the molecular wieght of the polymer can be accomplished by the presence of hydrogen in the reactor during polymerization.

In general, the charge order of the various components to the reactor consists of adding the washed magensium reducing agent/organoaluminum compound cocatalyst mixture, then the titanium compound, the diluent and finally hydrogen, if used. The diluent is a hydrocarbon unreactive under the polymerization conditions used. Examples of suitable diluents include isobutane, n-heptane, cyclohexane and the like. The reactor and its contents are then heated to the desired polymerization temperature, monomer such as ethylene and comonomer, if used, are added and polymerization begins. Polymerization times can vary from about 0.1 to 5 hours or more.

It is to be noted that the product formed on mixing the cocatalyst and the titanium tetrahalide can be used directly to effect polymerization without the addition of an activator such as triethyl aluminum or other organoaluminum compounds. Thus, subject to the provision that the catalyst can contain adjuvants, the final catalyst can be viewed as consisting essentially of the reaction product resulting from the admixture of the cocatalyst and the titanium tetrahalide.

The resulting polymers are useful for fabrication by means of conventional equipment into fibers, film, molded articles and the like.

EXAMPLE

In a dry flask equipped with a dropping funnel, condenser and stirrer was placed 60 g (2.47 gram atoms) of 50 mesh magnesium powder. While gently stirring the magnesium metal under a nitrogen atmosphere, 263.5 g (2.47 moles) of dry n-pentyl chloride was slowly added through the funnel at a rate sufficient to keep unreacted alkyl halide gently refluxing. Addition time was 4 hours. At the conclusion of the reaction, 300 ml of dry n-hexane were added to the flask and the stirred mixture was heated to boiling and refluxed for 4 hours. Following this treatment, the flask was transferred to a dry box and the hexane was removed under reduced pressure leaving behind the magnesium reducing reagent as a gray residue. Portions of the powdered solid were individually slurried with a 25 weight percent solution of diethylaluminum chloride (DEAC) dissolved in n-heptane using 3.4 ml of the DEAC solution per gram of magnesium reducing agent. In additiion to this, 5 ml of dry n-heptane was used per gram of magnesium reducing agent. Five gram portions of the magnesium reducing agent were used in preparing each cocatalyst component except in runs 4 and 5 in which a 3.7 g portion was employed. Each mixture was placed in a 12 ounce (355 ml) glass beverage bottle along with 50 g of ½" (1.27 cm) ceramic balls, capped and ball milled for the time shown. The washing treatment, when used, consisted of diluting the ball milled slurry with 6 times its volume of n-hexane (unless otherwise specified) followed by milling for 15 minutes, allowing the mixture to settle overnight and decanting the liquid, generally the same volume as the added n-hexane. Portions of the cocatalyst were used in subsequent runs in which ethylene was polymerized in the absence of hydrogen.

A one gallon (3.78 liter) stirred reactor, purged with dry nitrogen, was charged under an isobutane flush with cocatalyst mixture, titanium tetrachloride and 2 liters of dry isobutane as diluent, in the order named. The reactor and its contents were heated to 100° C. ethylene was admitted to give a partial pressure of 100 psig (689 kPa) and polymerization commenced. Following each run, the polymer was recovered by flashing off diluent and ethylene and the weight of recovered polymer determined.

The number of wash treatments used for each cocatalyst, weight of titanium tetrachloride charged (as titanium), calculated atom ratios of Al/Mg and Al/Ti, run length in minutes, and productivity as g polymer per g titanium are presented in the table.

Table

Ethylene Polymerization

| Run | No. of Washes | Magnesium Reducing Agent Wash Liquid(s) | Titanium Milli-gram/Atoms | Initial Atom Ratios Al/Mg | Al/Ti | Catalyst Productivity g/g Ti | Polymerization Time, Minutes | Cocatalyst Mill Time Hours | Remarks |
|---|---|---|---|---|---|---|---|---|---|
| 1 | 0 | none | 0.004 | 0.73 | 215 | 1,300,000 | 60 | ¼ | Control |
| 2 | 1 | n-hexane | 0.001 | 0.73 | 900 | 3,700,000 | 60 | ¼ | Invention |
| 3 | 2 | n-hexane | 0.001 | 0.73 | 900 | 6,100,000 | 60 | ¼ | Invention |
| 4 | 0 | none | 0.002 | 0.73 | 430 | 2,400,000 | 60 | 6 | Control |
| 5 | 1 | n-hexane | 0.002 | 0.73 | 430 | 5,500,000 | 60 | 6 | Invention |
| 6 | 2 | n-hexane | 0.004 | 0.73 | 215 | 750,000 | 8 | 6 | Invention |
| 7 | 2 | n-hexane | 0.001 | 0.73 | 900 | 2,100,000 | 21 | 6 | Invention, same cocatalyst as run 6 |
| 8 | 5 | n-hexane | 0.001 | 0.73 | 900 | Trace | 60 | 6 | Control because of removal of cocatalyst |
| 9 | 5 | n-hexane | 0.001 | 0.73[1] | 900 | 7,200,000 | 25 | 6 | Invention, same cocatalyst as run 7 |
| 10 | 2 | n-hexane | 0.001 | 0[2] | 0 | 4,400,000 | 60 | 6 | Invention |
| 11 | 2 | toluene, hexane[3] | 0.001 | 0[2] | 0 | 4,800,000 | 60 | 6 | Invention |

[1] Added 3.2 ml 25 wt. % DEAC solution to washed cocatalyst to replace initial DEAC removed by wash treatment.
[2] No DEAC was initially added to magnesium reducing agent slurry. After wash treatment, sufficient DEAC solution was added to give a calculated Al/Mg ratio of 0.73 and Al/Ti ratio of 900.
[3] Magnesium reducing agent slurry washed first with toluene, then with n-hexane.

As indicated by the groupings in the table, the source of the magnesium reducing agent used in the preparation of the cocatalyst used in the runs grouped together was the same. Identical preparative methods for the production of each magnesium reducing agent prepared was employed, however. Thus, the results in each group are fairly compared with one another, i.e., runs 1–3 by themselves, runs 4–5 by themselves, runs 6–9 themselves and runs 10–11 by themselves.

Control runs 1 and 4 are representative of productivity results obtained using a ball milled cocatalyst which is not washed with a hydrocarbon following milling and at the metal atom ratios employed, Runs 2, 3, 5, 6, 7, and 9 show increased production of polyethylene when the cocatalyst is washed 1 to 2 times with a suitable hydrocarbon. The catalyst systems of runs 6, 7, and 9, were so active that it was necessary to prematurely terminate each run prior to 60 minutes because it was not possible to control the polymerization temperature at or near 100° C. Run 8 indicates that washing the cocatalyst 5 times with the volume of hydrocarbon used per wash (about 6 times the volume of cocatalyst) has substantially removed all the DEAC initially present in the cocatalyst. Since the cocatalyst is inactive in the absence of a suitable organoaluminum compound it was necessary to replace it to obtain an active system as exemplified by run 9. Runs 10 and 11 show that when only the magnesium reducing agent portion of the cocatalyst mixture is washed with a hydrocarbon a very active cocatalyst is obtained when DEAC is added to the treated magnesium reducing agent. Run 11 shows that washing with an aromatic hydrocarbon followed by a wash with a paraffin gives results comparable to a paraffin wash only.

While this invention has been described in detail for the purpose of illustration it is not to be construed as limited thereby but is intended to cover all changes and modifications within the spirit and scope thereof.

We claim:

1. A process comprising:
   reacting an organic halide of the formula RX or R'X$_2$ where X represents halogen, R is an alkynyl, alkenyl, alkyl, aryl, cycloalkenyl or cycloalkyl radical or combination thereof having from 1 to 12 carbon atoms per molecule and R' is a saturated divalent aliphatic hydrocarbyl radical containing 2 to 10 carbon atoms per molecule and magnesium metal in the absence of any complexing diluent to form a magnesium reducing agent reaction mixture containing at least 10 weight percent each of a diorganomagnesium compound and a magnesium halide;
   washing the total magnesium reducing agent reaction mixture thus produced with an unreactive liquid hydrocarbon to remove material soluble in said unreactive liquid hydrocarbon;
   contacting said magnesium reducing agent with an organoaluminum compound to form a cocatalyst mixture; and
   thereafter contacting said cocatalyst mixture with a titanium tetrahalide to form a catalyst.

2. A method according to claim 1 wherein said organic halide is added dropwise to said magnesium metal in the absence of any extraneous diluent.

3. A process according to claim 1 wherein said magnesium reducing agent is washed before contact with said organoaluminum compound.

4. A method according to claim 1 wherein said magnesium reducing agent is washed after contact with said organoaluminum compound.

5. A method according to claim 4 wherein an additional amount of said organoaluminum compound is added after said washing.

6. A method according to claim 1 wherein said organic halide is added slowly to said magnesium metal in the absence of any extraneous diluent.

7. A process according to claim 1 wherein said titanium tetrahalide is titanium tetrachloride.

8. A method according to claim 7 wherein said organic halide has the formula RX wherein R is an alkynyl, alkenyl, alkyl, aryl, cycloalkenyl or cycloalkyl radical having 1 to 12 carbon atoms per molecule and X is chlorine or bromine, and said organoaluminum compound has the formula R''$_2$AlZ in which R'' is an alkyl or aryl radical containing from 1 to 12 carbon atoms per molecule and Z is a hydrogen atom or a halogen atom, and wherein said organic halide is added dropwise to said magnesium.

9. A method according to claim 1 wherein there is present in addition a polar organic compound which is an electron donor.

10. A method according to claim 9 wherein the atom ratio of aluminum to magnesium is within the range of 0.5:1 to 2:1, the molar ratio of said organoaluminum compound to said polar organic compound is within the range of 1:1 to 300:1 and the molar ratio of the titanium compound to said polar organic compound is in the range of 1:1 to 200:1.

11. A method according to claim 9 wherein said polar organic compound is one of triethylamine, triphenyl phosphite, ethyl anisate, or ethyl benzoate.

12. A method according to claim 1 wherein said washing is done by forming a slurry of said magnesium reducing agent as a solid in a hydrocarbon liquid selected from the group consisting of n-pentane, n-hexane, n-heptane, isooctane, dodecane, cyclohexane, benzene, toluene, and xylene, thereafter milling the resulting slurry and separating at least a part of the liquid from the solid.

13. A method according to claim 12 wherein said slurry is milled prior to said separation and said separation is accomplished by allowing the solid to settle and decanting the supernatant liquid.

14. A method according to claim 1 wherein said organic halide is n-pentyl chloride, said organic halide is added dropwise to said magnesium in the absence of any extraneous diluent, said organoaluminum compound is diethylaluminum chloride, said titanium tetrahalide is titanium tetrachloride and wherein said magnesium reducing agent is washed a plurality of times in solvent comprising n-hexane.

15. A catalyst produced by the method of claim 14.

16. A catalyst produced by the method of claim 1.

17. A polymerization process comprising contacting at least one mono-1-olefin under polymerization conditions with the catalyst of claim 1.

18. The method according to claim 17 wherein said olefin comprises at least a predominant amount of ethylene.

19. A method according to claim 17 wherein said polymerization is carried out in the presence of a liquid diluent and a temperature such that polymer formed is insoluble in said diluent, said catalyst being used without the subsequent addition of an organoaluminum compound activator.

* * * * *